United States Patent Office 3,830,785
Patented Aug. 20, 1974

3,830,785
THERMOSETTING POLYURETHANE COATINGS BASED ON BLOCKED CYCLO-ALIPHATIC DIISOCYANATES
Yutaka Matsui, Shizuoka, and Seiji Kazama, and Jugo Goto, Kawanishi, Japan, assignors to Takeda Chemical Industries, Ltd., Osaka, Japan
No Drawing. Filed Nov. 14, 1972, Ser. No. 306,196
Claims priority, application Japan, Nov. 20, 1971, 46/93,470
Int. Cl. C08g 22/24, 22/32
U.S. Cl. 260—77.5 TB                 10 Claims

ABSTRACT OF THE DISCLOSURE

The present invention relates to a thermosetting urethane coating composition comprising an active-hydrogen-containing compound of molecular weight of about 400 to about 50,000 and a blocked polyisocyanate component which is obtainable by reacting $\omega,\omega'$-diisocyanatodimethylcyclohexane with a low molecular polyol having a molecular weight of about 60 to about 300 in a ratio of NCO/OH of not less than about 2.6, removing the unreacted $\omega,\omega'$-diisocyanatodimethylcyclohexane and reacting the resulting polyisocyanate with an isocyanate blocking agent. The polyurethane coating compositions of this invention have long pot life, excellent resistance to discoloration and high gloss.

---

The present invention is concerned with a thermosetting urethane coating composition.

As a polyurethane type coating agent, there have been put into practical use so-called two-can type polyurethane coating compositions. In the two-can type compositions, free NCO-terminated compounds are prepared, on one hand, and compounds having terminal active hydrogen atoms are prepared, on the other hand, and upon application, these two components are admixed with each other. However, in these compositions, there have been pointed out such defects that the NCO components have only a short pot-life because of high reactivity of free NCO groups with moisture and other active-hydrogen-containing substances, and further the mixing procedure upon application is rather troublesome and thus not advantageous from an industrial point of view. For the purpose of improving these defects, it has been proposed to stabilize isocyanate groups by blocking them with various kinds of blocking agents. The blocked isocyanates which have been commonly used are phenol-blocked tolylene diisocyanate-trimethylolpropane adduct (TDI–TMP adduct), phenol-blocked 4,4'-diisocyanatodiphenylmethane and cresol-blocked TDI trimer. The polyurethanes based on these prepolymers invariably tend to yellow and are poor in weathering properties, so that they cannot be used when non-yellowing coats are desired. While hexamethylene diisocyanate, $\omega,\omega'$-diisocyanatodimethylbenzene, 4,4'-diisocyanatodimethylcyclohexane, etc. are generally known as non-yellowing isocyanate compounds, no blocked adducts based on any of these isocyanates are practically used. The results of the studies by the present inventors have also shown that the blocked compounds obtained from these isocyanates are invariably very poor in solubility or compatibility with solvents and active hydrogen compounds and therefore coating layers prepared by using these blocked compounds show poor properties, particularly very poor gloss.

Namely, heretofore, there has not been presented a thermosetting urethane coating composition which is stable for a long period of time, not yellowed even after a long exposure to light, and can give a coating layer having homogeneous and excellent properties, particularly high gloss, and thus it has long been a desideratum to provide such an urethane coating composition as mentioned just above.

Under the circumstances, the present inventors conducted extensive study leading to the finding that the above desideratum can be satisfied by selecting a particular kind of isocyanate compound and causing this isocyanate compound to form an adduct with a low molecular polyol under specified conditions. The present invention was completed on the basis of the finding.

The principal and essential object of the present invention is, thus, to provide an urethane coating composition which is stable, non-yellowing and can give a coating layer having homogeneous and excellent properties, particularly high gloss.

The coating composition of the present invention comprises (1) an active-hydrogen-containing compound and (2) a blocked isocyanate component, the said blocked isocyanate component being one prepared by reacting $\omega,\omega'$-diisocyanatodimethylcyclohexane ($H_6XDI$) with a low molecular polyol in an NCO/OH ratio of not less than 2.6, removing the unreacted $\omega,\omega'$-diisocyanatodimethylcyclohexane and reacting the resulting polyisocyanate with an isocyanate blocking agent.

As regards said $\omega,\omega'$-diisocyanatodimethylcyclohexane, any of $\omega,\omega'$-diisocyanato-1,2-dimethylcyclohexane (1,2-$H_6XDI$), $\omega,\omega'$-diisocyanato-1,3-dimethylcyclohexane (1,3-$H_6XDI$) and $\omega,\omega'$-diisocyanato-1,4-dimethylcyclohexane (1,4-$H_6XDI$) can be employed and mixtures of two or more of them are also useful. Among them, $\omega,\omega'$-diisocyanato-1,3-dimethylcyclohexane is preferred from a practical point of view.

The low molecular polyols are those having 2 to 4 OH groups per molecule and a molecular weight of about 60 to about 300, more preferably 62 to about 200, which are exemplified by diols such as ethylene glycol, 1,2-propylene glycol, 1,3-propylene glycol, diethylene glycol, dipropylene glycol, 1,4-butylene glycol, 1,3-butylene glycol, 2,3-butylene glycol, pentanediol, neopentyl glycol, hexylene glycol, cyclohexane dimethanol, 2-methyl-2,4-hexanediol, 2,2,4-trimethyl-1,3-pentanediol, N-methyldiethanolamine, etc., triols such as trimethylolpropane, trimethylolbutane, trimethylolethane, 1,2,6-hexanetriol, glycerine, triethanolamine, etc.; and tetraols such as pentaerythritol, diglycerine, N,N,N',N'-tetrakis(2 - hydroxypropyl)ethylene diamine and the like. These low molecular polyols can be used either singly or as a mixture of two or more. Among them, triols are preferred in view of the compatibility, drying speed and physical properties of the coating layer.

The reaction between $\omega,\omega'$-diisocyanatodimethylcyclohexane and a low molecular polyol can be carried out in the absence of a solvent. It can also be conducted in a solvent which has no active hydrogen (for example, ethyl acetate, butyl acetate, tetrahydrofuran, dimethylformamide, dimethylacetamide, methyl ethyl ketone, dioxane, etc.). In this reaction, $\omega,\omega'$-diisocyanatodimethylcyclohexane and the low molecular polyol are used in such a ratio as NCO/OH being not less than about 2,6, preferably, about 4 to about 10. The reaction temperature is from about 40° to about 150° C., preferably from about 60° to about 90° C.

The reaction period is about 10 minutes to about 10 hours.

By this reaction, all of the OH groups of the low molecular polyol are reacted with the isocyanate compound, and the excess isocyanate compound remains unreacted. After the reaction, the solvent, if it is used, is removed by conventional manner such as distillation, and then, the unreacted $\omega,\omega'$-diisocyanato-dimethylcyclohexane is removed by extraction or distillation.

When the unreacted material is to be removed by extraction, one may advantageously use, as an extractant, an aliphatic hydrocarbon having 5 to 10 carbon atoms (e.g. n-heptane, n-hexane, ligroine, n-octane, 3-methylpentane or 3-ethylpentane), or a mixture of such an aliphatic hydrocarbon with an aromatic hydrocarbon (e.g. benzene, toluene, o-, m- or p-xylene, ethylbenzene, cumene, n-propylbenzene or mesitylene), a lower monocarboxylic acid alkyl ester (e.g. ethyl acetate, butyl acetate or isopropyl acetate), a low molecular aliphatic ether (e.g. ethyl ether or Cellosolve acetate) or with a low molecular aliphatic ketone (e.g. acetone, methyl ethyl ketone or methyl isobutyl ketone). An amount of the extractant to be employed is usually about 1 to about 5 times of the reaction mixture.

The extraction is conducted usually at room temperature to about 60° C., more preferably about 40 to about 50° C.

Other extraction techniques or conditions may be any of conventional ones.

When one wishes to remove the unreacted $\omega,\omega'$-diisocyanatodimethylcyclohexane by distillation, a conventional vacuum distillation procedure may be employed and, in this case, the use of a thin-film distillation apparatus is preferred.

An amount of unreacted diisocyanate remaining in the isocyanate compound obtained after the above removal procedure is desirably as low as possible but it is not always necessary to achieve a complete removal but the inclusion of not more than 20%, preferably not more than 10%, of unreacted $\omega,\omega'$-diisocyanatodimethylcyclohexane is tolerable.

The thus-obtained adduct of $\omega,\omega'$-diisocyanatodimethylcyclohexane to a low molecular polyol is then reacted with an isocyanate blocking agent. Though, theoretically, one should use an isocyanate blocking agent in the proportion of one mole to each isocyanato group, it is desirable, for practical purposes, to use about 98 to 110 percent of the theoretical requirement of a blocking agent.

The isocyanate blocking agent mentioned above is exemplified by alcohols such as methanol, ethanol, propanol, butanol, Cellosolve, methyl-Cellosolve, butyl-Cellosolve, Carbitol, benzyl alcohol, furfuryl alcohol cyclohexanol, etc.; active methylene compounds such as dimethyl malonate, diethyl malonate, methyl acetoacetate, ethyl acetoacetate, acetyl-acetone, etc.; oximes such as formaldoxime, acetaldoxime, acetoxime, methyl ethyl ketoxime, cyclohexanoneoxime, acetophenoxime, benzophenoxime, diethyl glyoxime, etc.; lactams such as ε-caprolactam, δ-valerolactam, γ-butyrolactam, β-propiolactam, etc. Further, phenols, mercaptans, amides, imides, amines, imadazoles, ureas, carbamates, imines, sulfurous acid salts, etc. may also be used as a blocking agent. Among these agents, the oximes are particularly advantageous in consideration of dissociation temperature, rate of dissociation, compatibililily or solubility in solvents and polyols and toxicity.

While the blocking reaction may be carried out in the absence of a solvent, it is usually conducted in the presence of a solvent. The solvent for this purpose may be any solvent that is capable of dissolving the $\omega,\omega'$-diisocyanatodimethylcyclohexane-low molecular polyol adduct and the isocyanato-blocking agent to be employed and that, yet, will not adversely affect the reaction. Thus generally, use is made of esters (ethyl acetate, butyl acetate, amyl acetate, etc.), ketones (acetone, methyl ethyl ketone, methyl isobutyl ketone, cyclohexanone, etc.), ethers (ethyl ether, dioxane, tetrahydrofuran, ethyl glycol acetate, etc.), aromatic hydrocarbons (benzene, toluene, xylene, aromatic high boiling petroleum fractions) and so forth.

The blocked isocyanate thus obtained is admixed with an active-hydrogen-containing compound and, as required, the mixture is diluted with a diluent to prepare a composition of this invention. In this connection, one may dilute the blocked isocyanate with a diluent in the first place and, then, blend it with an active-hydrogen-containing compound.

The active-hydrogen-containing compound mentioned above is exemplified by polyether polyols, polyester polyols, acrylic polyols, etc., which have a molecular weight in the range of about 400 to about 50,000. If an active hydrogen compound having a molecular weight of less than about 400 is employed, there is a tendency toward a harsh film when the composition is applied to a surface; conversely if one employs a compound having a molecular weight in excess of 50,000, the viscosity of the composition will be too high for efficient and effective coating work. Thus, both of them are undesirable.

The polyether polyols are exemplified by those having a molecular weight of about 400 to about 4000, more preferably about 800 to about 2500, and hydroxyl number of about 80 to about 600, which are prepared by subjecting an alkylene oxide (e.g. ethylene oxide, propylene oxide, tetrahydrofuran, etc.) to addition polymerization with a low molecular polyol having 2 to 8 carbon atoms and molecular weight of about 50 to about 300 (e.g. ethylene glycol, diethylene glycol, propylene glycol, dipropylene glycol, glycerine, trimethylol propane, 1,2,6-hexane triol, pentaerythritol, sorbitol, sorbitan, sucrose, etc.).

The polyester polyols are exemplified by those having a molecular weight of about 400 to about 4000, more preferably about 800 to about 2,500 and hydroxyl number of about 80 to about 600, which are prepared by reacting the low molecular polyol as mentioned above or an epoxy compound (e.g. fatty acid glycidyl esters, etc.) with a polycarboxylic acid (e.g. adipic acid, succinic acid, maleic acid, phthalic acid, terephthalic acid, etc.) or its derivatives, or by ring-opening polymerization of a cyclic ester, such as polycaprolactone, polybutyrolactone, etc.

A part (e.g. about 5 to about 50 mole percent) of the terminal hydroxyl groups of the above polyester polyols may be modified into ester groups by reacting with higher fatty acid such as castor oil fatty acid, hydrogenated castor oil fatty acid, coconut oil fatty acid, etc. Further, upon preparation of the above polyester polyols, castor oil may be co-used as a polyol component together with the low molecular polyol.

The acrylic type polyols are those having a molecular weight of about 500 to about 50,000, more preferably about 1,000 to about 10,000 and hydroxyl number of about 8 to about 300, which are prepared by polymerization of a compound of the general formula

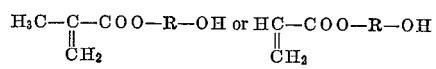

(wherein R is a lower alkylene having carbon atoms of 1 to 6, such as methylene, ethylene, propylene, methyl methylene, isopropylene, butylene, isobutylene, etc.) or by copolymerization of the above mentioned compound with other polymerizable ethylenically unsaturated compound containing 2 to 10 carbon atoms per molecule (e.g. styrene, acrylic acid, dibutyl fumarate, methacrylic acid, acrylic acid esters, methacrylic acid esters, ethylene, propylene, vinyl chloride, vinylidene chloride, butadiene, isoprene, vinyl acetate, etc.). The number of OH groups per molecule of the homopolymers or copolymers of this class can be varied in a wide range due to the kind of the starting monomer or monomers used as well as the polymerization degree, but the use are preferably made of those having 2 to 20 OH groups, more preferably 4 to 12 OH groups per molecule. The polymers of this class employable in this method are particularly exemplified by homopolymers of the compound of the above formula, whose polymerization degree is about 5 to about 15 and copolymers of the compound of the above formula with one or more of polymerizable monoethylenically unsaturated monomers, the content of the compound of the above formula in the copolymers being about 5 to about 95 weight parts and a molecular weight of the copolymers being about 500 to about 50,000. These acrylic type polymers may be prepared after a manner described in, for example, U.S. Pat. 3,028,367 and Japanese Patent Publication No. 9240/1968.

Among the active-hydrogen-containing compounds, the polyester polyols, modified polyester polyols and the acrylic polyols are preferably used in this invention.

To prepare a composition of this invention, the blocked isocyanate adduct and active-hydrogen-containing compound are admixed together in such proportions that about 0.2 to about 10 equivalents, preferably about 0.5 to about 4 equivalents of active hydrogen groups will be available for each equivalent of blocked isocyanate groups.

As the diluent mentioned above, one may employ alcohols such as methanol, ethanol, isopropanol, n-butanol, isobutanol, Cellosolve, methyl Cellosolve, butyl-Cellosolve, Carbitol, benzyl alcohol, etc., as well as the solvents mentioned above for the blocking reaction. These diluents are preferably used in such amounts that the nonvolatile matter content (i.e. the blocked isocyanate adduct and the active-hydrogen-containing compound) will not be less than 20 weight percent, more preferably, about 25 to about 50 weight percent.

In the composition of this invention, one may as required incorporate such additives as a curing catalyst, pigment, dye, leveling agent, stabilizer and coalescent.

The composition of this invention thus prepared can be kept as such in storage for an extended period of time without causing gelation or other undesirable change and, when need arises, one can dilute it to a suitable concentration, apply it to a substrate surface by a conventional means such as spraying or brushing and heat the coat to a temperature of, usually, about 100° to about 200° C. to cause the composition to cure on the surface.

By this way, the polyurethane composition of this invention can be used as a coating agent for top-coat or undercoat of various substrates, such as automobiles, buildings, furniture, electric goods, etc. The cured coating layer thus formed shows homogeneous and excellent mechanical, chemical and weathering properties, particularly high gloss and gloss retention.

Further, by virtue of these excellent properties, the composition of this invention can be used also as an adhesive agent, a finishing agent for fibrous materials, etc.

In the following Examples, "part" is "weight part" unless otherwise stated, and the relation between "part(s) by weight" and "parts(s) by volume" is the same as that between "grams" and "milliliters."

EXAMPLE 1

1164 Parts of $\omega,\omega'$-diisocyanato-1,3-dimethylcyclohexane and 134 parts of trimethylolpropane are admixed together (NCO/OH=4.0) and the mixture is allowed to react at 70 to 80° C. for 5 hours. Then, using 2600 volume parts of a mixed solvent system of 80% hexane and 20% benzene at room temperature, the reaction product is extracted to remove the unreacted $\omega,\omega'$-diisocyanato-1,3-dimethylcylohexane. This extraction procedure is followed by the addition of ethyl acetate, whereupon 720 parts of a 75% solution of the polyisocyanate resin in ethyl acetate is obtained. To this solution is added 142 parts of acetoxime in small installments, and the mixture is reacted at 30 to 50° C. for 60 minutes. Then, 275 parts of Cellosolve acetate is added, whereupon a 60% solution of a blocked polyisocyanate is obtained. To this solution is added 603 parts of a polyester polyol having an average molecular weight of 1900, a hydroxyl number of 181 and an average number of functional groups of 6, which is prepared from 45.4 mole percent of phthalic acid, 36.4 mol percent trimethylolpropane and 18.2 mole percent of coconut oil fatty acid, followed by the addition of 5.7 parts of 1,3-diacetoxy-tetra-n-butyldistannoxane. The procedure yields a thermosetting urethane coating composition (A).

EXAMPLE 2

To 720 parts of polyisocyanate resin, solution obtained according to Example 1, there are added 378 parts of tert-butyl-p-hydroxybenzoate and 1.5 parts of 1,3-diacetoxy-tetra-n-butyl distannoxane. The mixture is reacted at 60° C. for 3 hours, at the end of which time 432 parts of Cellosolve acetate is added to obtain a 60% solution of the blocked polyisocyanate. Then, 603 parts of the same polyester polyol as that used in Example 1 is added to obtain a thermosetting urethane coating composition (B).

EXAMPLE 3

2910 Parts of $\omega,\omega'$-diisocyanato-1,3-dimethylcyclohexane is admixed with 134 parts of trimethylolpropane (NCO/OH=10.0) and the mixture is reacted at 70 to 80° C. for 5 hours. Then, the unreacted diisocyanate is removed by extraction with 1000 volume parts of a mixture of 20% benzene and 80% hexane at room temperature, followed by the addition of ethyl acetate, whereupon a 75% solution of a polyisocyanate resin in ethyl acetate is obtained. Then, 165 parts of methyl ethyl ketoxime is gradually added and, under cooling, the mixture is reacted at 10 to 20° C. for 60 minutes, after which time 285 parts of Cellosolve is added. The procedure gives a 60% solution of a blocked polyisocyanate. This product is admixed with 2080 parts of a 50 weight percent ethyl acetate-toluene solution of acryl polyol having hydroxyl number of 50, which is prepared by copolymerization of 30.0 parts of n-butylacrylate, 23.2 parts of 2-hydroxyethyl methacrylate and 46.8 parts of styrene, and 3.5 parts of 1,3-diacetoxy-tetra-n-butyldistannoxane to obtain a thermosetting urethane coating composition (C).

REFERENCE EXAMPLE 1

By a procedure similar to that in Example 1, hexamethylene diisocyanate, $\omega,\omega'$ - diisocyanato - 1,3 - dimethylbenzene and 4,4'-diisocyanatodicyclohexylmethane are respectively used in place of $\omega,\omega'$-diisocyanato-1,3-dimethylcyclohexane. Amounts of these diisocyanates are selected so that the blocked NCO contents in these cases are identical with that in Example 1. In each instance, when Cellosolve acetate is added after the blocking reaction, a white turbidity is encountered. Moreover, when the polyester polyol is added to each of the products, they cannot give a homogeneous mixture because of incompatibility. To each of the mixtures is added titanium oxide in such an amount that pigment weight concentration is 40%. The compositions thus obtained are diluted to a suitable degree with cellosolve acetate and applied on the surface of a mild steel sheet. After baking at 150° C. for 30 minutes, the gloss of the baked coating layer is evaluated. The result is as follows;

| Isocyanate used: | Gloss (60° reflection, percent) |
|---|---|
| HMDI | 41 |
| XDI | 32 |
| $H_{12}$MDI | 48 |

Experimental data 1

Each of the thermosetting urethane coating compositions (A), (B) and (C) according to Examples 1, 2 and 3 was diluted to a suitable degree with a lacquer thinner and applied on the surface of a mild steel sheet. After baking at 140° C. for 20 minutes, the properties of the baked coating layer were evaluated. The results are set forth in Table 1.

TABLE 1

| Properties | Composition | | |
|---|---|---|---|
| | A | B | C |
| Hardness, sward-rocker | 63 | 61 | 52. |
| Hardness, pencil | 2H | 2H | 2H. |
| Impact test (du Pont's method) | ½", 500 g., 40 cm. | ½", 500 g., 30 cm. | ¼", 1 kg., 20 cm. |
| Scratch adhesion test | 20/20 | 20/20 | 20/20. |
| Bending test | 8 mm., OK | 8 mm., OK | 8 mm., OK. |
| Cross cut test | 100/100 | 100/100 | 100/100. |
| Ericksen test | 8 mm., OK | 8 mm., OK | 8 mm., OK. |
| Solvent resistance [spot test (ethyl acetate)] | Pass | Pass | Pass. |
| Surface appearance | Excellent | Excellent | Excellent. |

EXAMPLE 4

To 34.2 parts of 60% solution of the blocked isocyanate adduct obtained in Example 3, there is added 24.7 parts of the same polyester polyol as that used in Example 1. Then, 26 parts of titanium oxide and 15.1 parts of Cellosolve acetate are added. The mixture is kneaded well in a ball mill to obtain a thermosetting urethane coating composition (D).

Experimental data 2

A suitable amount of lacquer thinner was added to the thermosetting urethane coating composition of Example 4, and the diluted composition was sprayed onto a mild steel sheet. The coat was then baked at 150° C. for 30 minutes, whereupon a white, superbly glossy baked-on coat was obtained. The properties of thus obtained coat are as follows.

| | |
|---|---|
| Gloss (60° reflection percent | 98.5. |
| Hardness, Sward-rocker | 72. |
| Hardness, Pencil | 2H–3H. |
| Scratch adhesion test | 20/20. |
| Bending test | 8 mm. OK. |
| Impact test (Du Pont's method) | ½", 500 g., 50 cm. |
| Cross cut test | 100/100. |

Further, even after one-year outdoor exposure, the gloss remained to be 96% with no change being observed in appearance.

EXAMPLE 5

To 720 parts of polyisocyanate adduct obtained in Example 1 is added 175 parts of cellosolve in small installments and the mixture is heated at 60 to 70° C. for 60 minutes. Then, 297 parts of Cellosolve acetate is added to the reaction mixture, whereby a 60% solution of a blocked polyisocyanate is obtained. To this solution are added 603 parts of the same polyester polyol as in Example 1 and 5.7 parts of 1,3-diacetoxy-tetra-n-butyldistannoxane. The procedure yields a thermosetting urethane coating composition (E).

EXAMPLE 6

1170 parts of the 60% solution of a blocked polyisocyanate, which is obtained in Example 3, are admixed with 3500 parts of 50 weight percent ethyl acetate-toluene solution of acryl polyol having hydroxyl number of 40, which is prepared by compolymerization of 30.5 parts of methyl methacrylate, 18.5 parts of 2-hydroxy methyl methacrylate and 51.0 parts of styrene, and 3.5 parts of 1,3-diacetoxy-tetra-n-butyldistannoxane. The procedure yields a thermosetting urethane coating composition (F).

EXAMPLE 7

1,170 parts of the 60% solution of a blocked polyisocyanate, which is obtained in Example 3, are admixed with 472 parts of Desmophen-1100 (Hydroxyl number 220.5, nonvolatile content 100%, produced and sold by Bayer A.G. in West Germany.) and 3.5 parts of 1,3-diacetoxy-tetra-n-butyl-distannoxane, whereby a thermosetting urethane coating composition (G) is obtained.

EXAMPLE 8

1,170 parts of the 60% solution of a blocked polyisocyanate, which is obtained in Example 3, are admixed with 416 parts of Desmophen-800 (Hydroxyl number 250, nonvolatile content 100%, produced and sold by Bayer A.G. in West Germany) and 3.5 parts of 1,3-diacetoxy-tetra-n-butyldistannoxane, whereby a thermosetting urethane coating composition (H) is obtained.

EXAMPLE 9

1,170 parts of the 60% solution of a blocked polyisocyanate, which is obtained in Example 3, are admixed with 820 parts of 50% Cellosolve solution of Desmophen-650 (Hydroxyl number 250, nonvolatile content 100%, produced and sold by Bayer A.G. in West Germany) and 3.5 parts of 1,3-diacetoxy-tetra-n-butyldistannoxane, whereby a thermosetting polyurethane coating composition (I) is obtained.

EXAMPLE 10

60 parts of trimethylol propane is admixed with 100.5 parts of dipropylene glycol, followed by adding 1,164 parts of ω,ω'-diisocyanato-1,3 dimethylcyclohexane, and the mixture is heated at 80° C. for 4 hours to allow a reaction to take place. After cooling to 35° C., the reaction mixture is extracted with 6,000 parts of n-hexane so as to remove the unreacted ω,ω-diisocyanato-1,3-dimethylcyclohexane.

185 Parts of ethyl acetate is added to the resultant to give 740 parts of 75% ethyl acetate solution of a polyisocyanate. Then 165 parts of methyl ethyl ketoxime is added to the solution in small installment, and the whole mixture is kept at 20 to 30° C. for 60 minutes to allow a reaction to take place. To the resultant is added 495 parts of Cellosolve to give a 60% solution of blocked polyisocyanate. To the solution are admixed 845 parts of the same polyester polyol as in Example 1 and 3.5 parts of 1,3-diacetoxy-tetra-n-butyldistannoxane, whereby a thermosetting urethane coating composition (J) is obtained.

EXAMPLE 11

135 Parts of 1,3-butanediol is added to 1,164 parts of ω,ω'-diisocyanato-1,3-dimethyl-cyclohexane at 70° C., and the mixture is heated at 80° C. for 4 hours to allow a reaction to take place. The resulting mixture is subjected to thin-layer distillation at 130 to 140° C. under a pressure of 2–3 mm. Hg to remove the unreacted ω,ω'-diisocyanato-1,3-dimethylcyclohexane. To the resultant is added ethyl acetate so as to give a 75% ethyl acetate solution. To the solution is added 165 parts of methylethylketoxime in small installments, and the mixture is kept at 10 to 20° C. for 60 minutes to allow a reaction to take place. Then 285 parts of Cellosolve is added to the resulting mixture, whereby a 60% solution of blocked polyisocyanate is obtained. To the solution are added 245 parts of the same polyester polyol as in Example 1 and 3.5 parts of 1,3-diacetoxy-tetra-n-butyldistannoxane. The procedure yields a thermosetting urethane coating composition (K).

EXAMPLE 12

134 Parts of 1,2,6-hexanetriol is added to 2328 parts of ω,ω'-diisocyanato-1,3-dimethylcyclohexane at 70° C., and the mixture is heated at 70 to 80° C. for 4 hours to allow a reaction to take place. After cooling to 40° C., the resulting mixture is extracted with a mixed solvent system of 80% hexane and 20% benzene to remove the unreacted ω,ω'-diisocyanato-1,3-dimethylcyclohexane. To the resultant is added 180 parts of ethyl acetate to give a 75% solution of a polyisocyanate. Then 165 parts of methylethyl ketoxime is added gradually to the above solution, and the mixture is kept at 10 to 20° C. for 60 minutes to allow a reaction to take place. To the resulting mixture is added 285 parts of Cellosolve to give a 60% solution of a blocked polyisocyanate. Then 845 parts of the same polyester polyol as in Example 1 and 3.5 parts of 1,3-diacetoxy-tetra-n-butyldistannoxane are admixed with the solution obtained above, whereby a thermosetting urethane coating composition (L) is obtained.

Experimental Data 3

To each of the thermosetting urethane coating compositions (E), (F), (G), (H), (I), (J), (K) and (L) was added a Cellosolve acetate solution of titanium oxide in such an amount that the pigment weight concentration of each of the thermosetting urethane coating composition is 40%. Then the mixtures are comingled with ball-mill, and sprayed on the surface of a mild steel sheet, followed by curing at 150° C. for 30 minutes to give cured coating layers. The properties of the layers are shown in Table 2.

TABLE 2

| Properties | Composition | | | | | | | |
|---|---|---|---|---|---|---|---|---|
| | E | F | G | H | I | J | K | L |
| Gloss (60 reflection, percent) | 95 | 91 | 96 | 93 | 93 | 95 | 92 | 96. |
| Hardness, sward-rocker | 72 | 68 | 60 | 68 | 74 | 62 | 60 | 68. |
| Hardness, pencil | 3H | 2H | H | 2H | 3H | H | H | H. |
| Impact test (du Pont's method) | ½″ 500 g., 50 cm. | ¼″, 500 g., 50 cm. | ½″, 500 g., 50 cm. | ½″, 500 g., 50 cm. | ½″, 500 g., 40 cm. | ½″, 500 g., 50 cm. | ½″, 500 g, 50 cm. | ½″, 500 g., 50 cm. |
| Bending test | 6 mm., OK | 4 mm., OK | 2 mm., OK | 2 mm., OK | 8 mm., OK | 2 mm., OK | 2 mm., OK | 2 mm., OK. |
| Cross cut test | 100/100 | 100/100 | 100/100 | 100/100 | 100/100 | 100/100 | 100/100 | 100/100. |

What is claimed is:

1. A thermosetting urethane coating composition comprising (a) an active-hydrogen-containing compound of molecular weight of about 400 to about 50,000 and (b) a substantially completely blocked polyisocyanate component which is obtained by reacting ω, ω′-diisocyanato-dimethylcyclohexane with a low molecular weight polyol having a molecular weight of about 60 to about 300 in a ratio of NCO/OH of not less than about 2.6, then removing unreacted ω, ω′-diisocyanato-dimethylcyclohexane by solvent extraction or by distillation so as to make the content of the unreacted ω, ω′-diisocyanato-dimethylcyclohexane in the resultant reaction product about 20% or less of the total unreacted ω, ω′-diisocyanato-dimethylcyclohexane initially present in said reaction product and then reacting said reaction product with an isocyanate blocking agent; the active-hydrogen-containing compound and the blocked polyisocyanate component being admixed in a ratio such that about 0.2 to about 10 equivalents of active hydrogen groups are available for each equivalent of blocked isocyanate groups.

2. A composition according to claim 1 wherein the ω, ω′-diisocyanato-dimethylcyclohexane is removed by solvent extraction with a solvent selected from the group consisting of an $C_5$ to $C_{10}$ aliphatic hydrocarbons, a mixture of said aliphatic hydrocarbon with an aromatic hydrocarbon, a lower monocarboxylic acid alkyl ester, a low molecular aliphatic ether and a low molecular weight aliphatic ketone.

3. A composition according to claim 1 wherein the ω, ω′-diisocyanato-dimethylcyclohexane is removed by distillation.

4. A thermosetting urethane coating composition as claimed in claim 1, wherein the active-hydrogen-containing compound is a polyether polyol having a molecular weight of about 400 to about 4,000 and a hydroxyl number of about 80 to about 600.

5. A thermosetting urethane coating composition as claimed in claim 1, wherein the active-hydrogen-containing compound is a polyester having a molecular weight of about 400 to about 4,000 and a hydroxyl number of about 80 to about 600.

6. A thermosetting urethane coating composition as claimed in claim 1, wherein the active-hydrogen containing compound is an acryl polyol having a molecular weight of about 500 to about 50,000 and a hydroxyl number of about 8 to about 300 which is prepared by homopolymerization of a compound of the general formula

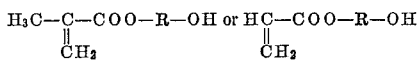

wherein R is a lower alkylene having carbon atoms of 1 to 6 or copolymerization of the above compound with other polymerizable ethylenically unsaturated compound containing 2 to 10 carbon atoms per molecule.

7. A thermosetting urethane coating composition as claimed in claim 1, wherein the blocked polyisocyanate component is one obtained by reacting ω, ω′-diisocyanato-dimethylcyclohexane with a low molecluar polyol having a molecular weight of about 60 to about 200 in an NCO/OH ratio of about 4 to about 10, removing the unreacted ω, ω′-diisocyanatodimethylcyclohexane and reacting the resulting polyisocyanate with an isocyanate blocking agent.

8. A thermosetting urethane coating composition as claimed in claim 1, wherein the isocyanate blocking agent is an oxime.

9. A thermosetting urethane coating composition as claimed in claim 1, wherein ω, ω′-dissocyanatodimethylcyclohexane is ω, ω′ - diisocyanato - 1,3-dimethylcyclohexane.

10. A thermosetting urethane coating composition as claimed in claim 1, wherein the low molecular polyl is a triol.

References Cited

UNITED STATES PATENTS

| 3,183,112 | 5/1965 | Gemassmer | 260—77.5 AT |
| 3,350,362 | 10/1967 | Potts | 260—77.5 AT |
| 3,676,402 | 7/1972 | Matsui et al. | 260—77.5 TB |
| 3,676,405 | 7/1972 | Labana | 260—77.5 CR |
| 3,694,389 | 9/1972 | Levy | 260—77.5 CR |
| 3,711,571 | 1/1973 | Farah | 260—77.5 TB |

H. S. COCKERAM, Primary Examiner

U.S. Cl. X.R.

260—31.4 R, 33.4 UB, 75 NT, 77.5 AT